T. McLutes,
Drain Tile.
No. 87,694. Patented Mar. 9, 1869.
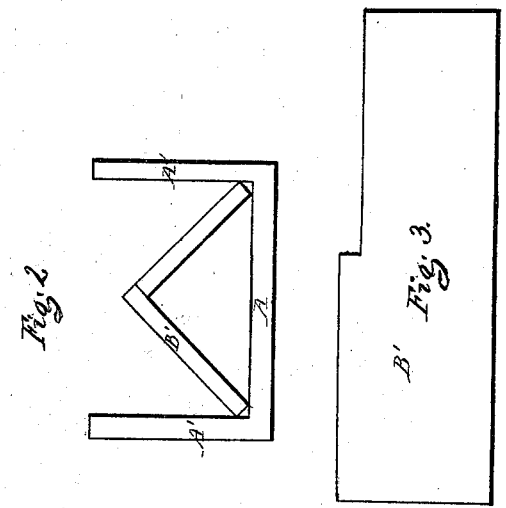
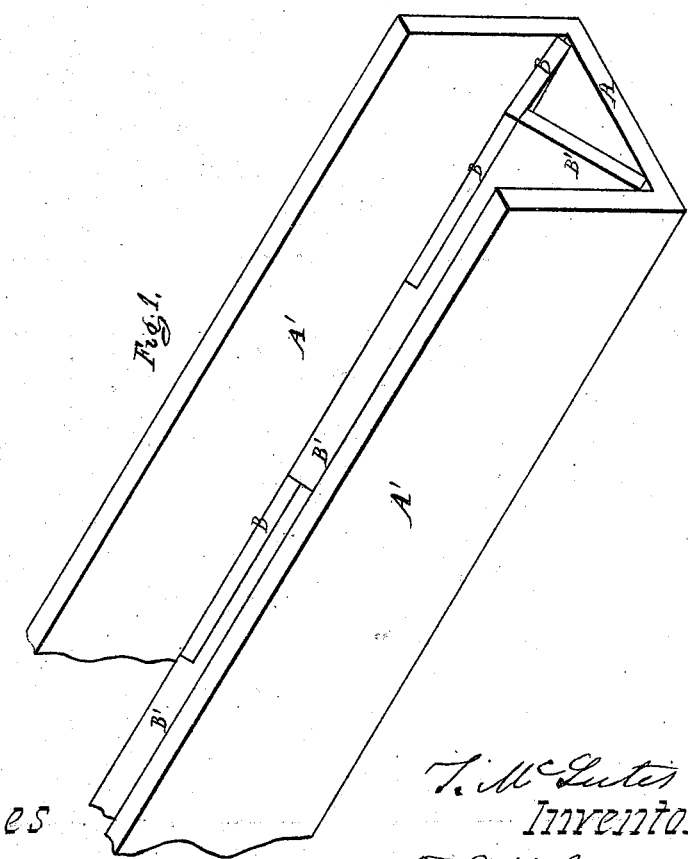
Witnesses
F. Clausen
Wm. T. Hutchinson
T. McLutes
Inventor
D. P. Holloway & Co

THOMAS M. C. LUTES, OF NEW MOUNT PLEASANT, INDIANA.

Letters Patent No. 87,694, dated March 9, 1869.

IMPROVED COVERING FOR BLIND DITCHES.

The Schedule referred to in these Letters Patent and making part of the same.

*To all whom it may concern:*

Be it known that I, THOMAS M. C. LUTES, of New Mount Pleasant, in the county of Jay, in the State of Indiana, have invented a new and useful Improvement in Coverings for Blind Ditches; and I do hereby declare that the following is a full, clear, and exact description of the same, reference being had to the annexed drawings, making part of this specification, in which—

Figure 1 is a perspective view of a blind ditch having my improved covering placed therein.

Figure 2 is an end elevation of the same.

Figure 3 is a side elevation of one section of the covering.

Corresponding letters represent corresponding parts in each of the figures.

This invention relates to an improvement in what are termed "blind ditches" or "drains;" and It consists in a novel and improved covering for such ditches, in combination with the trough through which the water is conveyed, as will appear from the following description.

A' A' are the sides thereof, which may be joined to or connected with the bottom, in any suitable manner, or the bottom may be dispensed with, and the side pieces be allowed to rest upon strips of wood or other material embedded in the earth, with their upper surfaces even with the general level of the bottom of such ditch or drain.

B and B' show the covering or roofing to the water-passage, which is made in sections, as shown in fig. 3 of the drawings, and may be of wood, or baked clay, or any other suitable material.

These sections have each a projection upon one of their edges, so arranged that when placed in position, the projections upon one will fit into depressions in the other, and thus prevent any one of them from being displaced.

Each of these sections may be secured to its fellow, if deemed necessary, by means of pins or nails, which pass through one and into the other; but this will not generally be found necessary, as, in consequence of their construction and arrangement, the earth thrown or placed upon them will hold them securely in their places, when arranged as shown in figs. 1 and 2 of the drawings.

It is apparent that the parts or sections composing this roofing may be of any convenient length, and they may be of any width required to give the necessary area to the ditch or drain, and when made of wood, they may be sawed of equal width and thickness, and when so sawed they may be piled upon the saw-carriage, and a line sawed out of them, extending from one of their ends to the centres thereof, and at the proper distance from one of their edges, to leave the depression made by removing the portion thus cut away equal to the thickness of the plank from which they are cut.

By preparing the sections as above described, very little labor will be required to perfect them for being placed in the ditch or drain. Hence I am enabled to construct a durable ditch or drain, and at a comparatively small cost.

One important advantage which arises from my method of constructing drains is, that as a consequence of the arrangement of the sections B', with reference to the sides A A' of the box, I am enabled to provide for conveying away any water which may percolate through the earth, which is thrown upon the drain at any and all points, as it will be conducted to its outlet with as much certainty as will that which is received into the passage formed by the bottom of the box and roofing sections.

I am aware that covering for ditches has heretofore been constructed in sections of the form given to mine. These, therefore, I do not claim; but having thus described my invention,

What I claim, and desire to secure by Letters Patent, is—

The within-described sections of roofing, in combination with the trough A and A', substantially as shown and described.

In testimony whereof, I have signed my name to this specification, in the presence of two subscribing witnesses.

THOMAS M. C. LUTES.

Witnesses:
JAMES N. TEMPLER,
CHARLES A. BLACK.